(12) United States Patent
Falk et al.

(10) Patent No.: US 10,686,812 B2
(45) Date of Patent: Jun. 16, 2020

(54) DEVICE AND METHOD FOR DETECTING MANIPULATION OF A PROGRAM CODE

(71) Applicant: Siemens Aktiengesellschaft, München (DE)

(72) Inventors: Rainer Falk, Poing (DE); Steffen Fries, Baldham (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 91 days.

(21) Appl. No.: 15/124,758

(22) PCT Filed: Feb. 9, 2015

(86) PCT No.: PCT/EP2015/052572
§ 371 (c)(1),
(2) Date: Sep. 9, 2016

(87) PCT Pub. No.: WO2015/135704
PCT Pub. Date: Sep. 17, 2015

(65) Prior Publication Data
US 2017/0019420 A1    Jan. 19, 2017

(30) Foreign Application Priority Data
Mar. 11, 2014   (DE) .................. 10 2014 204 417

(51) Int. Cl.
*G06F 21/53* (2013.01)
*H04L 29/06* (2006.01)
*G06F 21/54* (2013.01)

(52) U.S. Cl.
CPC .......... *H04L 63/1425* (2013.01); *G06F 21/53* (2013.01); *G06F 21/54* (2013.01); *H04L 63/1416* (2013.01)

(58) Field of Classification Search
CPC .......... G06F 21/50; G06F 21/51; G06F 21/52; G06F 21/53; G06F 21/55; G06F 21/56; G06F 21/57; G06F 21/577
See application file for complete search history.

(56) References Cited

U.S. PATENT DOCUMENTS

| | | | | |
|---|---|---|---|---|
| 7,779,472 B1 * | 8/2010 | Lou | ........................ | G06F 21/566 726/22 |
| 8,826,013 B1 * | 9/2014 | Kodukula | ............... | G06F 21/53 380/279 |

(Continued)

FOREIGN PATENT DOCUMENTS

| | | |
|---|---|---|
| CN | 101789866 A | 7/2010 |
| CN | 101840361 A | 9/2010 |

(Continued)

OTHER PUBLICATIONS

Intel, Evolution of Integrity Checking with Intel® Trusted Execution Technology: an Intel IT Perspective, Aug. 2010, https://www.intel.com/content/dam/doc/white-paper/intel-it-security-trusted-execution-technology-paper.pdf (Year: 2010).*

(Continued)

*Primary Examiner* — Khang Do
(74) *Attorney, Agent, or Firm* — Schmeiser, Olson & Watts LLP

(57) ABSTRACT

A device for detecting a manipulation to a program code wherein the program code is configured to be executed from an execution environment on a computing system, is provided. The device includes a comparator unit which is configured to compare data of the program code with reference data in order to produce a comparison result to compare, if the execution environment conveys a termination command to the program code, and a detection unit which is configured to detect a manipulation of the program code on the basis of the comparison result. The device can (Continued)

prevent data, which is produced or used during the execution of a program code, from continuing to be used after termination of the program code if an attack or manipulation of the program code has occurred. A method is further proposed for detecting a manipulation to a program code.

13 Claims, 2 Drawing Sheets

(56) References Cited

U.S. PATENT DOCUMENTS

| | | | |
|---|---|---|---|
| 2003/0023856 A1 | 1/2003 | Home | |
| 2004/0054917 A1* | 3/2004 | Obrecht | G06F 21/566 726/22 |
| 2005/0278535 A1 | 12/2005 | El Gammal et al. | |
| 2007/0005992 A1* | 1/2007 | Schluessler | G06F 21/54 713/193 |
| 2007/0234070 A1* | 10/2007 | Horning | G06F 21/14 713/190 |
| 2007/0277041 A1* | 11/2007 | Kulessa | H04L 9/3236 713/176 |
| 2008/0016339 A1* | 1/2008 | Shukla | G06F 21/53 713/164 |
| 2008/0244114 A1* | 10/2008 | Schluessler | G06F 13/28 710/24 |
| 2008/0244572 A1* | 10/2008 | Sahita | G06F 9/45533 718/1 |
| 2009/0172814 A1* | 7/2009 | Khosravi | G06F 21/51 726/23 |
| 2009/0307748 A1 | 12/2009 | Blom | |
| 2010/0146501 A1* | 6/2010 | Wyatt | G06F 21/53 718/1 |
| 2010/0251369 A1* | 9/2010 | Grant | G06F 21/554 726/23 |
| 2012/0233446 A1 | 9/2012 | Gammel | |
| 2014/0181984 A1* | 6/2014 | Kundu | G06F 21/64 726/26 |
| 2015/0256341 A1* | 9/2015 | Ye | H04L 41/0803 713/164 |
| 2019/0278925 A1* | 9/2019 | Ely | G06F 21/606 |

FOREIGN PATENT DOCUMENTS

| | | |
|---|---|---|
| DE | 10 2006 036 111 B3 | 1/2008 |
| WO | 2012 135192 A2 | 10/2012 |

OTHER PUBLICATIONS

Intrusion detection system, Wikipedia, http://de.wikipedia.org/wiki/Intrusion_Detection_System.
Microsoft Secure Boot, Webopedia, http://www.webopedia.com/TERM/M/microsoft_secure_boot.html.
Java Tutorials, Verifying Signed JAR tiles, Archiviert in Archive.org, URL:https://web_archive.org/web/20130920155417/http://docs.oracle.com/javase/tutorial/deployment/Jar/verify.html; p. 1, Sep. 20, 2013.
Sudip Chahal et al: 11 Evolution of 3-14 Integrity Checking with Intel Trusted Execution Technology: an Intel IT Perspective.
Seshadri A et al: "Pioneer: Verifying Code Integrity and Enforcing Untampered Code Execution on Legacy Systems". Operating Systems Review (ACM) 2005 Association for Computing Machinery US.
Btrfs, Wikipedia, URL:http://en.wikipedia.org/w/index.php?title=Btrfs&oldid=594528361, pp. 1-12, Aug. 2, 2014.
International Search Report for PCT Application No. PCT/EP2015/052572, dated Jul. 13, 2015.
Non-English Chinese OA dated Jun. 1, 2018 for Application No. 201580013172.5.

\* cited by examiner

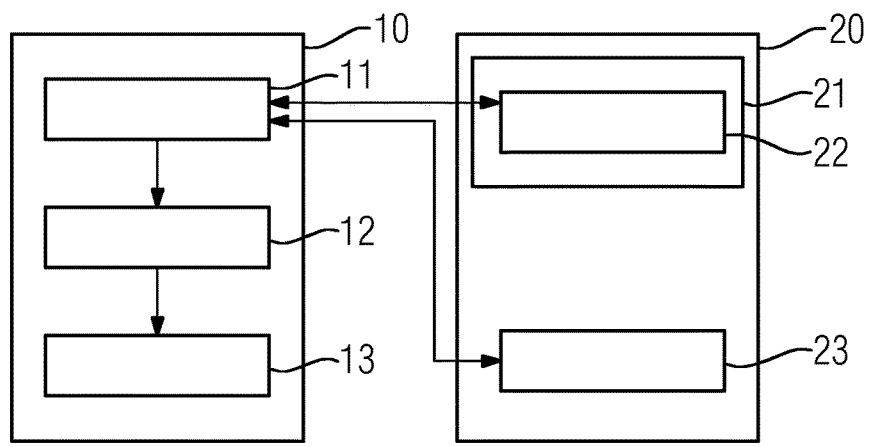
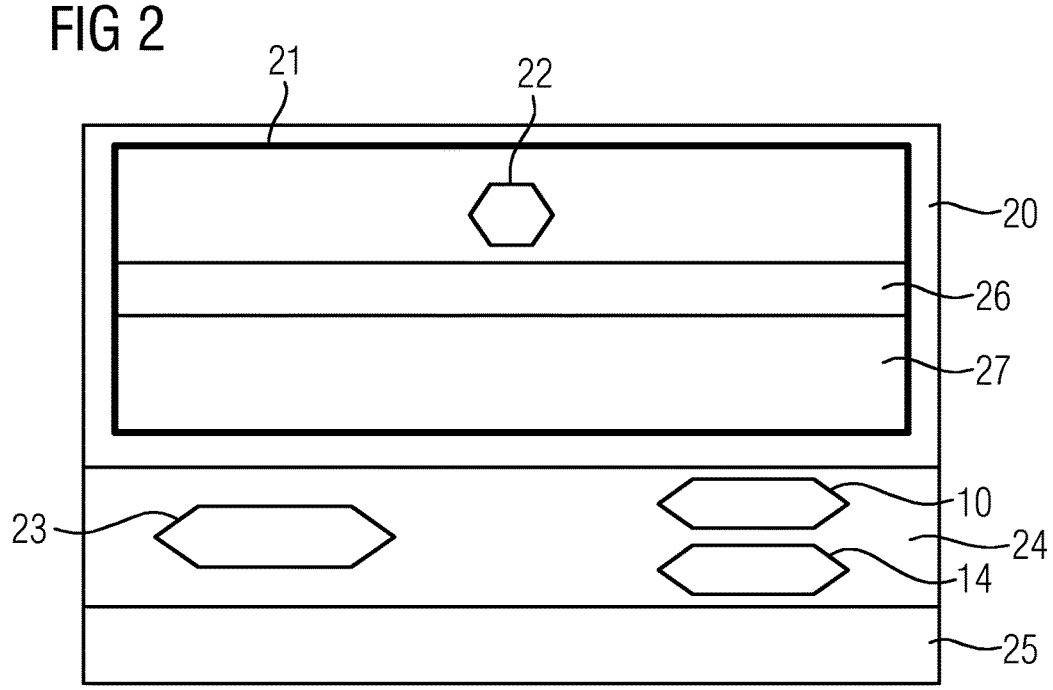

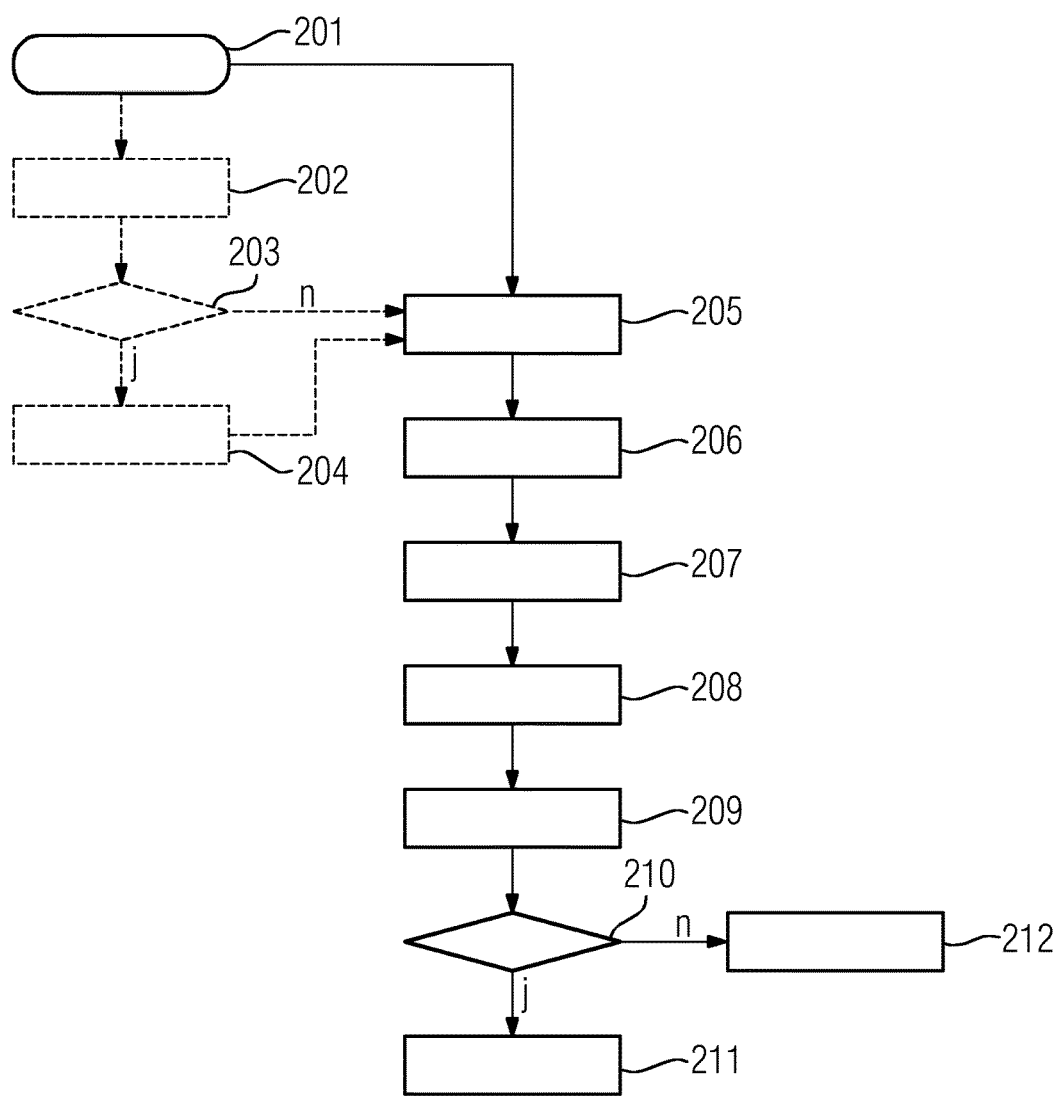

DEVICE AND METHOD FOR DETECTING MANIPULATION OF A PROGRAM CODE

CROSS-REFERENCE TO RELATED APPLICATIONS

This application claims priority to PCT Application No. PCT/EP2015/052572, having a filing date of Feb. 9, 2015, based off of German application No. 102014204417.0 having a filing date of Mar. 11, 2014, the entire contents of which are hereby incorporated by reference.

FIELD OF TECHNOLOGY

The following relates to a device for detecting manipulation of a program code. Furthermore, embodiments of the present invention relates to a computing system having such a device and to a corresponding method for detecting manipulation of program code.

BACKGROUND

In particular in safety-critical systems, that is to say systems in which the emphasis is on functional and operational safety, protection of the equipment integrity or system integrity, i.e. the invariability of the installed software or firmware, is an important factor. Ensuring the protection of the equipment integrity or even of the configuration parameters supports here the integrity of computation results (data) and therefore the functionality of the equipment.

WO 2012/135192 A2 discloses, for example, monitoring by means of a virtual machine monitor (VMM) whether the communication with a virtual machine potentially contains damaging code.

Generally, virus scanners are known which serve to detect damaging functions such as computer viruses or Trojan horses. Furthermore, intrusion detection systems are known which are intended to detect intrusions directed at a computer system or computer network (see also http://de.wikipedia.org/wiki/Intrusion Detection System).

DE 10 2006 036 111 B3 discloses a method and checking system for reliably transmitting a message from a first zone into a second zone. In this context, the message is transmitted from the first zone to an evaluation unit of a third zone by means of a data diode. Copies of the message are made available here to various analysis units which check this message and, where appropriate, pass it on into a second zone as a function of the evaluation result of all the analysis units. After successful analysis has taken place, an analysis unit can be reset in order to avoid possibly being adversely affected by malware.

Furthermore, what is referred to as a "Secure Boot" is known (see http://www.webopedia.com/TERM/M/microsoft_secure_boot.html). In this context, a secure boot functionality is made available during the starting or booting, in order to prevent malware from being started during the booting process of the system.

A runtime integrity check (see http://www. intl.com/content/dam/doc/white-paper/intl-it-security-trusted-execution-technology-paper.pdf) is also known. In this context, checking for malware or manipulation is also carried out during the starting of a system or an application.

SUMMARY

An aspect relates to easily detecting manipulation to a program code after the termination of the program code.

Accordingly, a device for detecting manipulation of a program code is proposed, wherein the program code is configured to be executed by an execution environment on a computing system. The device has a comparator unit which is configured to compare data of the program code with reference data in order to make available a comparison result after the execution environment has transferred a termination command to the program code, and a detection unit which is configured to detect manipulation of the program code on the basis of the comparison result.

The termination command can be transferred explicitly, for example as an operating system result, to the program code, with the result that the program code can react thereto. It is also possible that the termination command is transferred implicitly by preventing a further execution of the program code by the execution environment. The transfer of a termination command to the program code can be triggered e.g. by a timer, an operating medium monitoring function of the execution environment, by means of a control signal or by means of a user interface.

As already explained above, the integrity of the computing results, for example the results of a program code, is an important requirement, in particular in safety-critical areas. In this context it is important to ensure that intrusions which take place during the run time of a program code, i.e. manipulation of the program code, can be detected and reacted to. The proposed device makes it possible to check the data of the program code in order to detect possible changes and react correspondingly.

Program code is understood in this context to be an application or a computer program which is executed in an embedded execution environment on a computing system, for example a computer. During the execution, the program code generates, changes or uses data which is referred to herein as data of the program code. When the program code is manipulated, this data is also changed. If this changed data, which is based on the manipulated program code, is therefore now compared with reference data which corresponds to data which would be produced by a non-manipulated program code or would be present by means of such a non-manipulated program code, it is easily possible to detect manipulation of the program code after its termination or during its termination.

The comparator unit can compare the data of the program code with the reference data at any time after the execution environment has transferred a termination command to the program code. Renewed execution of the program code can be prevented depending on the comparison result.

The execution environment can be, for example, an operating system which is installed on the computing system.

Manipulation can be understood in this context to be any non-permitted intervention from the outside into the program code which gives rise to non-desired changes to the program code or to data connected thereto. Manipulation of the program code can therefore also give rise to undesired changes to the execution environment or to a manipulation thereof.

The respective unit, for example, comparator unit or detection unit, can be implemented by means of hardware and/or also by means of software. In the case of a hardware implementation, the respective unit can be embodied as a device or as part of a device, for example as a computer or as a microprocessor. In the case of software implementation, the respective unit can be embodied as a computer program product, as a function, as a routine, as part of a program code or as an executable object.

According to one embodiment, the data of the program code is the program code itself, data generated by the program code and/or data used by the program code.

Since manipulation of the program code is to be detected, data which relates to the program code itself, i.e. is a component of the program code, or data which has been generated or changed by the program code, is used for the checking. A change can also be carried out, for example, by use of the data by the program code.

According to a further embodiment, the execution environment is a secure execution environment, in particular a virtual machine or a virtual machine monitor or a hypervisor or a sandbox.

A secure execution environment is understood to be a runtime environment or execution environment such as a computer program which is executed together with an application program, i.e. the program code which cannot communicate directly with the operating system or which can communicate directly with hardware components, or makes it capable of running, that is to say executable, on the respective computer or computing system by intervening between the application program and the operating system. Examples of such execution environments are virtual machines (VM), virtual machine monitors (VMM), hypervisors, separation kernels or sandboxes.

According to a further embodiment, the comparator unit is also configured to compare the data of the program code with further reference data if the computing system transfers a further termination command to the execution environment.

The further reference data can be the reference data such as have been described above. In this case, the comparator unit does not carry out the described comparison until both the program code and the execution environment are terminated.

In a further embodiment, the comparator unit is configured to carry out two comparisons, the first after/during the termination of the program code and the second after/during the termination of the execution environment.

The comparator unit can use different reference data for each comparison.

According to a further embodiment, the further reference data is a checksum assigned to the execution environment. In addition, the data of the program code corresponds to data of the execution environment which has been generated and/or used by the program code during a runtime of the program code.

According to this embodiment, there is a checksum, e.g. a digital signature, a message authentication code (MAC) or hash value for the execution environment. The program code is loaded into the execution environment and executed and implements a specific function such as, for example, a calculation, and supplies a result. The result is stored in a data memory after the calculation. After the execution of the program code, the execution environment is terminated. The memory content of the execution environment, i.e. the data of the execution environment, can then be checked for changes by forming a checksum with the original (i.e. the further reference data). If a change to the memory content of the execution environment itself is detected, this can be detected as an attempt at manipulation by the program code.

According to a further embodiment, the comparator unit is configured to compare data of the execution environment with further reference data when the execution environment starts.

In addition to the checking after termination of the program code and/or the execution environment, i.e. post-mortem checking, checking can also be carried out when the execution environment starts. This is also referred to as a secure boot.

According to a further embodiment, the data of the program code is data which is stored in defined memory areas of a memory of the computing system, wherein the defined memory areas are not required during the execution of the program code.

According to this embodiment, checkpoints or checking code or checking memory areas are provided. These are not required for the actual function of the program code. If the program code is, however, manipulated by means of malware, manipulation can be detected at these checking memory areas. This has the advantage that instead of a main function which is possibly difficult to check, a "sacrificial function" can be checked. A main function can be difficult to check when e.g. its code is frequently updated, with the result that it would be difficult for the check to determine the reference value.

According to a further embodiment, the detection unit is configured to store detected manipulation in a log table.

This log table or individual log entries can be transmitted to a log server. This log server can be a central computer in a network into which the computer system is also integrated. In this way, a plurality of computing systems within the network can exchange their log entries or detected manipulations with one another.

According to a further embodiment, the device has a control unit which is configured to receive a manipulation warning signal from the detection unit in the event of a detected manipulation.

The control unit can decide on the basis of such a signal how the detected manipulation is to be dealt with. The manipulation warning signal can also have information about manipulated data.

According to a further embodiment, the control unit is configured to block at least one functionality of the program code and/or of the execution environment as a function of the received manipulation warning signal.

This can prevent manipulated data from being used further. In order to prevent a persistent effect of the manipulation, it can also be sufficient to block just the part of the functionalities of the program code and/or of the execution environment which is related to the manipulation or which would access manipulated data.

According to a further embodiment, the control unit is configured to block renewed execution of the program code and/or of the execution environment as a function of the received manipulation warning signal.

According to this embodiment, the entire restarting of the program code and/or of the execution environment is prevented. The prevention of the renewed booting can avoid new or further infiltration or manipulation.

According to a further embodiment, the program code is configured to execute a function which generates and stores a result. In addition, the detection unit is configured to mark the generated result on the basis of the comparison result as compromised or non-compromised.

The generated result can also be marked as possibly compromised. The decision about the further use of the result can be made on the basis of these markings.

According to a further embodiment, the control unit is configured to reject a result which is marked as compromised and/or to store a result which is marked as non-compromised.

A stored result can be used and output further. Correspondingly, a rejected result cannot be output. For example, the result of the program code can be buffered. If the integrity checking, i.e. the checking for manipulation of the program code, reveals that it was not manipulated, a "commit" occurs, i.e. permanent confirmation or acceptance of the results. Otherwise, they can be canceled (roll back).

The program code can be, for example, an image for the administration, e.g. via a web interface, or an image for making available diagnostic data. In this context, a network connection to external networks which are possibly not trustworthy is necessary. Here, an image can now be started and used for the provided task. When the network connection is signed off or terminated, the image is ended and its integrity is checked by means of the device described here. Depending on the result of the integrity checking, the new configuration setting is adopted and permanently stored or the result is made available to the backend diagnostic server and, as a function of the confirmation, the server accepts the previously made-available diagnostic data as valid.

The advantage of the described device is, inter alia, the possibility of detecting a potentially compromised program code and of therefore checking the validity of the result as a function of an integrity check of the execution environment after the running of the program. This makes it possible e.g. to prevent malware which is not yet known or for which there are not yet any patterns for virus scanners or the like from falsifying a result.

It is also possible to use the proposed device to find malware.

According to a further aspect, a computing system is proposed which has an execution environment for executing a program code, and a device for detecting manipulation of the program code, as explained herein.

Manipulation by the device is checked and detected on the computing system itself which makes available the execution environment.

In a further embodiment, the device for detecting manipulation can perform this monitoring as a separate hardware component, i.e. as what is referred to as a hardware watchdog. It is therefore possible for a checksum of a memory area to be detected and checked later. Data which is written into a buffer is not copied into a second memory (e.g. a permanent configuration memory) until checking has taken place. In a further embodiment, the device is a component of a server to which, for example, an image or a check value (hash value, checksum) of the image is made available after the execution of the image (i.e. of the program code).

According to a further aspect, a method for detecting manipulation of a program code is proposed, wherein the program code is configured to be executed by an execution environment on a computing system. The method has the following steps: comparing data of the program code with reference data in order to make available a comparison result after the execution environment has transferred a termination command to the program code, and detecting manipulation of the program code on the basis of the comparison result.

Furthermore, a computer program product is proposed which causes the method explained above to be carried out on a program-controlled device.

A computer program product such as, e.g., a computer program medium may be made available or supplied, for example, as a storage medium such as, e.g., memory card, USB stick, CD-ROM, DVD or else in the form of a downloadable file by a server in a network. This may be done, for example, in a wireless communication network by transmitting a corresponding file with the computer program product or the computer program medium.

The embodiments and features which are described for the proposed device apply correspondingly to the proposed method.

Further possible implementations of embodiments of the invention also comprise non-explicitly specified combinations of features or embodiments which have been described above or are described below with respect to the exemplary embodiments. In this context, a person skilled in the art will also add individual aspects as improvements or supplements to the respective basic form of embodiments of the invention.

Further advantageous refinements and aspects of embodiments of the invention are the subject matter of the dependent claims as well as of the exemplary embodiments of the invention which are described below. In the text which follows, the invention will be explained in more detail on the basis of preferred embodiments and with reference to the appended figures.

BRIEF DESCRIPTION

FIG. 1 shows a schematic block diagram of an exemplary embodiment of a device for detecting manipulation of a program code;

FIG. 2 shows a schematic block diagram of a computing system having a device for detecting manipulation of a program code and an execution environment;

FIG. 3 shows a schematic flowchart of a first exemplary embodiment of a method for detecting manipulation of a program code; and FIG. 4 shows a schematic flowchart of a second exemplary embodiment of a method for detecting manipulation of a program code.

In the figures, identical or functionally identical elements have been provided with the same reference symbols, unless stated otherwise.

DETAILED DESCRIPTION

FIG. 1 shows a device 10 for detecting manipulation of a program code 22.

The program code 22 is executed by an execution environment 21 on a computing system 20. The program code 22 may be, for example, an application which is executed in an execution environment 21 such as a virtual machine.

The device 10 has a comparator unit 11 and a detection unit 12.

After the execution environment 21 has transferred a termination command to the program code 22, the comparator unit 10 compares data of the program code 22 with reference data 23. The data of the program code 22 may be data which has been generated, used or changed by the program code 22, as well as data of the execution environment 21 or the program code 22 itself. The comparator unit 11 of the detection unit 12 makes available a comparison result on the basis of the comparison.

The detection unit 12 decides, on the basis of the comparison result, whether manipulation of the program code 22 has occurred. Manipulation of the program code can give rise to manipulation of the execution environment or of other data.

If manipulation has been detected, the detection unit 12 transmits a manipulation warning signal 14 to a control unit 13. The control unit 13 can then block or reject the manipulated data, prevent renewed execution of the program code 22 or take other measures in reaction to the manipulation.

An embodiment of a computing system 20 is shown in FIG. 2.

The computing system 20 is composed of hardware 25. An operating system 24 of the computing system 20 is provided on this hardware 25. Said operating system 25 in turn makes available an execution environment 21. The execution environment 21 can be here a virtual machine. The virtual machine 21 has a virtual hardware level 27 and a virtual operating system 26.

The application 22, i.e. the program code 22, is loaded within the virtual machine 21. Said application 22 is executed and generates a specific result which is buffered in a memory 23 (shared data memory). The device 10 for detecting manipulation of the program code 22, also referred to as integrity check unit or ICU, checks the program memory 23 for possible changes, for example after the powering down of the virtual machine 21, and signals said changes as a manipulation warning signal 14 via an alarm module.

This checking of the execution environment 21 after the termination of the execution environment 21 can be conceived of as a counterpart to a secure boot. An integrity test is carried out not only at the start and during the execution but also after the termination of the execution of the program code 22 and/or the execution environment 21. The checking can take place e.g. in such a way that an image of a virtual machine (VM image) is stored after the termination, and the stored image is checked. In the case of an execution environment 21 which is executed directly, the memory content which has the code of the execution environment can be checked at the powering down or at the next restart. A boot loader or BIOS or invariable ROM code for booting and powering down can therefore check the memory content of the execution environment 21 which is already inactive. For this purpose, for example the executed image can be compared with the reference image 23 which is loaded into the RAM memory from a flash memory during the booting process.

FIG. 3 shows a method for detecting manipulation of a program code 22, such as is carried out by the device 10 described above.

In a first step 101, data of the program code 22 is compared with reference data 23 in order to make available a comparison result after the execution environment 21 has transferred a termination command to the program code 22.

In a second step 102, manipulation of the program code 22 is detected on the basis of the comparison result.

FIG. 4 shows a further exemplary embodiment of a method for detecting manipulation of a program code 22.

After the start 201 of the method, the existence of a reference value 23 can firstly be checked, or said reference value 23 can be generated, in an optional branch (with dashed lines).

Firstly it is checked whether a reference value 23 already exists (step 202). In step 203 it is decided whether this is the initialization phase, i.e. if a reference value 23 does not exist yet. If it is the initialization phase, in step 204 a reference value 23 is stored in the data memory 23 and the method is subsequently continued at step 205. If it is not the initialization phase, the process jumps directly to step 205.

Without these optional steps 202-204, the method starts directly at step 205.

In step 205, the execution environment 21 is loaded. Subsequently, in step 206 the program code 22 is loaded, for example an application for carrying out a calculation and for making available a calculation result.

In step 207, the application 22 calculates a result and stores it in a data memory 23. In step 208, the program code 22 and the execution environment 21 are subsequently terminated or powered down.

In step 209, the comparator unit 11 compares the result and the reference value. If the comparison is successful (step 210), i.e. if the results correspond, the result is released for further use (step 211). If the comparison is not successful, i.e. the results do not correspond, a manipulation warning signal 14 is output (step 212).

Although the present invention has been described on the basis of exemplary embodiments, it can be modified in a variety of ways.

The invention claimed is:

1. A device for detecting manipulation of a program code, wherein the program code is configured to be executed by an execution environment on a computing system, the device comprising:
   a comparator unit configured to compare data of the program code with reference data to make available a comparison result after the execution environment has transferred a termination command to the program code;
   wherein the execution environment is a secure execution environment;
   wherein the data of the program code is checkpoint data which is not required during the execution of the program code;
   the comparator unit also configured to compare the data of the program code with further reference data to make available a further comparison result during or after the computing system transfers a further termination command to the execution environment; and
   a detection unit which is configured to detect manipulation of the program code on a basis of the comparison result and the further comparison result;
   wherein the reference data and the further reference data are different.

2. The device as claimed in claim 1, wherein the data of the program code is part of the program code itself, data generated by the program code, and/or data used by the program code.

3. The device as claimed in claim 1, wherein the further reference data is a checksum assigned to the execution environment, and in that the data of the program code corresponds to data of the execution environment which has been generated and/or used by the program code during a runtime of the program code.

4. The device as claimed in claim 1, wherein the comparator unit is configured to compare data of the execution environment with further reference data when the execution environment starts.

5. The device as claimed in claim 1, wherein the detection unit is configured to store detected manipulation in a log table.

6. The device as claimed in claim 1, wherein a control unit which is configured to receive a manipulation warning signal from the detection unit in the event of a detected manipulation.

7. The device as claimed in claim 6, wherein the control unit is configured to block at least one functionality of the program code and/or of the execution environment as a function of the received manipulation warning signal.

8. The device as claimed in claim 6, wherein the control unit is configured to block renewed execution of the program code and/or of the execution environment as a function of the received manipulation warning signal.

9. The device as claimed in claim 1, wherein the program code is configured to execute a function which generates and stores a result, and in that the detection unit is configured to mark the generated result on the basis of the comparison result as compromised or non-compromised.

10. The device as claimed in claim 6, wherein the control unit is configured to reject a result which is marked as compromised and/or to store a result which is marked as non-compromised.

11. A computing system having an execution environment for executing a program code and a device as claimed in claim 1 for detecting manipulation of the program code.

12. A method for detecting manipulation of a program code, wherein the program code is configured to be executed by an execution environment on a computing system, comprising: comparing data of the program code with reference data in order to make available a comparison result after the execution environment has transferred a termination command to the program code, comparing data of the program code with further reference data in order to make available a further comparison result during or after the computing system transfers a further termination command to the execution environment, detecting manipulation of the program code on the basis of the comparison result and the further comparison result; wherein the execution environment is a secure execution environment, wherein the data of the program code is checking code which is not required for the actual function of the program code, and wherein the reference data and the further reference data are different.

13. A method for detecting manipulation of a program code, wherein the program code is configured to be executed by an execution environment on a computing system, wherein the execution environment is a secure execution environment, comprising:
   providing the program code, wherein the program code includes checkpoint data of the program code stored in defined memory areas of a memory of the computing system, wherein the defined memory areas are not required during the execution of the program code,
   comparing the checkpoint data of the program code with reference data in order to make available a comparison result after the execution environment has transferred a termination command to the program code,
   comparing the checkpoint data of the program code with further reference data in order to make available a further comparison result during or after the computing system transfers a further termination command to the execution environment, wherein the reference data and the further reference data are different, and
   detecting manipulation of the program code based on the result of the comparison of the checkpoint data of the program code with the reference data and the result of the comparison of the checkpoint data of the program code with the further reference data.

* * * * *